United States Patent
Ezoe (10) Patent No.: US 10,530,969 B2
(45) Date of Patent: Jan. 7, 2020

(54) MATCHING OUTPUT COLORS OF PRINTERS HAVING DIFFERENT GAMUT RANGES

(71) Applicant: SEIKO EPSON CORPORATION, Tokyo (JP)

(72) Inventor: Takashi Ezoe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/046,864

(22) Filed: Jul. 26, 2018

(65) Prior Publication Data

US 2019/0037111 A1    Jan. 31, 2019

(30) Foreign Application Priority Data

Jul. 28, 2017 (JP) ................. 2017-146086

(51) Int. Cl.
*H04N 1/60* (2006.01)

(52) U.S. Cl.
CPC ......... *H04N 1/6061* (2013.01); *H04N 1/6008* (2013.01); *H04N 1/6055* (2013.01)

(58) Field of Classification Search
CPC ........... H04N 1/00015; H04N 1/00023; H04N 1/00031; H04N 1/00034; H04N 1/00039; H04N 1/00045; H04N 1/00068; H04N 1/00082; H04N 1/00087; H04N 1/48; H04N 1/482; H04N 1/50; H04N 1/56; H04N 1/60; H04N 1/6002; H04N 1/6005; H04N 1/6008; H04N 1/6033; H04N 1/6038; H04N 1/6041; H04N 1/6052; H04N 1/6055;

(Continued)

(56) References Cited

U.S. PATENT DOCUMENTS 5,185,661 A * 2/1993 Ng ................. H04N 1/6019
  358/505
5,731,818 A * 3/1998 Wan ............... H04N 1/6058
  345/590

(Continued)

FOREIGN PATENT DOCUMENTS

CN    1643894      7/2005
JP    2011-61519 A  3/2011

(Continued)

OTHER PUBLICATIONS

European Search Report issued in Application No. 18186052 dated Nov. 20, 2018.

*Primary Examiner* — Scott A Rogers
(74) *Attorney, Agent, or Firm* — Workman Nydegger (57) ABSTRACT

Printers can be desirably color matched irrespective of whether or not a specified color is a color in the gamut range. A client device 100 determines by a gamut range evaluator 232 whether or not a specified color is a color in the gamut range, which is the range of colors a second printer 50 can reproduce; causes a color chart data generator 235 to generate image data for producing a color chart referenced to the specified color when the specified color is a color in the gamut range; and causes the generator to select a color on the gamut surface based on the specified color when the specified color is a color outside the gamut range, and generate the image data to create the color chart referenced to the selected color.

9 Claims, 8 Drawing Sheets

(58) Field of Classification Search
CPC .. H04N 1/6058; H04N 1/6061; H04N 1/6075; G06K 15/027; G06K 15/1878
See application file for complete search history.

(56) References Cited

U.S. PATENT DOCUMENTS

| | | | | |
|---|---|---|---|---|
| 5,745,263 | A * | 4/1998 | Oryo | H04N 1/6058 358/518 |
| 6,421,142 | B1 * | 7/2002 | Lin | H04N 1/6058 358/1.9 |
| 6,888,961 | B1 * | 5/2005 | Tamagawa | H04N 1/603 345/601 |
| 6,943,917 | B2 * | 9/2005 | Tamagawa | H04N 1/6055 358/1.9 |
| 7,227,666 | B1 | 6/2007 | MaCleod | |
| 7,595,807 | B2 * | 9/2009 | Nishimura | H04N 1/6058 345/589 |
| 7,643,036 | B1 * | 1/2010 | Rees | G01J 3/52 345/589 |
| 8,432,588 | B2 * | 4/2013 | Morovic | H04N 1/6058 345/590 |
| 8,675,253 | B2 * | 3/2014 | Katayama | H04N 1/6033 358/1.13 |
| 8,749,841 | B2 * | 6/2014 | Teraue | H04N 1/6058 358/1.6 |
| 8,773,715 | B2 * | 7/2014 | Katayama | H04N 1/6055 345/594 |
| 8,773,741 | B2 * | 7/2014 | Horita | H04N 1/6033 358/1.9 |
| 9,420,146 | B2 * | 8/2016 | Kuehn | H04N 1/6036 |
| 10,027,851 | B2 * | 7/2018 | Kobayashi | H04N 1/6008 |
| 2005/0024662 | A1 | 2/2005 | Yamada | |
| 2007/0097389 | A1 * | 5/2007 | Morovic | H04N 1/6033 358/1.9 |
| 2011/0058195 | A1 * | 3/2011 | Kano | H04N 1/46 358/1.9 |
| 2011/0058196 | A1 | 3/2011 | Teraue | |
| 2011/0069332 | A1 | 3/2011 | Katayama | |
| 2011/0075223 | A1 | 3/2011 | Katayama | |
| 2018/0278804 | A1 * | 9/2018 | Siegeritz | G06F 17/175 |

FOREIGN PATENT DOCUMENTS

| | | |
|---|---|---|
| JP | 5238650 B | 4/2013 |
| JP | 5479837 B | 2/2014 |
| JP | 5508975 B | 3/2014 |

* cited by examiner

MATCHING OUTPUT COLORS OF PRINTERS HAVING DIFFERENT GAMUT RANGES

BACKGROUND

1. Technical Field

The present invention relates to an information processing device, program, and control method of an information processing device.

2. Related Art

JP-A-2011-61519 describes a color matching method using a color chart as an example of a color matching method for matching the colors of images printed by multiple printers.

The image processing device described in JP-A-2011-61519 is an image processing device that adjusts the colors of the printout, and using the measured color value of a specified color as a reference color, produces image data for creating a color chart comprising multiple color patches bracketing the reference color. If the color of a patch in the color chart is a color outside the gamut range, the image processing device produces a black or white (colorless) patch indicating that the color is outside the gamut range.

The technology described in JP-A-2011-61519, however, does not address a color outside the gamut range of the printer being specified as the color to use for color matching. For example, when matching a color output by one printer to the colors another printer outputs, a color outside the gamut range of the one printer may be specified. In this event, color matching may be difficult for an inexperienced operator, and the optimum color may not be selected.

SUMMARY

An object of the present invention is to enable appropriate color matching for a printer regardless of whether or not the specified color is a color outside the gamut range.

To achieve the above object, an information processing device according to the invention has: a generator configured to generate image data to create a color chart with multiple patches; a receiver configured to receive specification of a specified color used as a reference to produce the patches; and an evaluator configured to determine whether or not the specified color is a color in a gamut range, which is a range of colors a printing device can reproduce; the evaluator, when the specified color is a color in the gamut range, causes the generator to generate the image data to create the color chart referenced to the specified color, and when the specified color is a color outside the gamut range, selects a color on a gamut surface based on the specified color, and causes the generator to generate the image data to create the color chart referenced to the selected color.

This aspect of the invention generates image data to create a color chart referenced to a specified color when the specified color is a color in the gamut range. When the specified color is a color outside the gamut range, a color on the gamut surface is selected based on the specified color, and image data for creating a color chart referenced to the selected color is generated. Color matching appropriate to the printers is therefore possible irrespective of whether or not the specified color is a color in the gamut range.

In another aspect of the invention, the evaluator, when the specified color is a color outside the gamut range, selects an approximate color close to the specified color from the gamut surface, and causes the generator to generate the image data to create the color chart including the selected approximate color as the patches.

In this aspect of the invention, when the specified color is a color outside the gamut range, a color chart containing patches of approximate colors that are close to the specified color and on the gamut surface can be produced. A color close the specified color can therefore be selected when the specified color is a color outside the gamut range.

In another aspect of the invention, the receiver receives a setting of a difference of color information between adjacent patches in the patches formed in the color chart; and the evaluator causes the generator to generate the image data to create the color chart with the patches in the color chart arranged so that the difference of the color information of adjacent patches differs by the set difference.

This aspect of the invention can generate image data for creating a color chart of patches arranged with the color information of each patch differing according to a setting received by a receiver. This makes finding a color matching the specified color easy, and improves efficiency.

In another aspect of the invention, the receiver includes a compensator configured to receive information specifying a patch contained in the color chart the printing device output, and based on the color information of the patch corresponding to the specifying information the receiver received, corrects a profile used to adjust the color output of the printing device.

This aspect of the invention desirably corrects the profile to match the color attributes of the printer, enabling desirably color matching printers.

In another aspect of the invention, when the specified color is a color outside the gamut range, the evaluator causes the generator to generate the image data including data indicating that the specified color is a color outside the gamut range.

This configuration enables reporting that the specified color is a color outside the gamut range. When the specified color is a color in the gamut range, a patch matching the specified color is selected, but when the specified color is a color outside the gamut range, a patch of a color close to the specified color must be selected. As a result, an appropriate patch can be easily selected by reporting that the specified color is a color outside the gamut range.

In another aspect of the invention, when the specified color is a color outside the gamut range, a number of patches contained in the image data generated by the generator is less than the number of patches contained in the image data generated by the generator when the specified color is a color in the gamut range.

This aspect of the invention enables easily selecting a patch of a color close to the specified color.

In another aspect of the invention, the receiver receives specification of multiple specified colors; and when all of the multiple specified colors are colors outside the gamut range, for all of the multiple specified colors, the evaluator selects a color on a gamut surface, and causes the generator to generate the image data to create the color chart referenced to the selected color.

This aspect of the invention enables specifying multiple colors as specified colors. When all of the multiple specified colors are colors outside the gamut range, this aspect of the invention selects, for all of the multiple specified colors, a color on a gamut surface, and generates image data to create a color chart referenced to the selected color.

In another aspect of the invention, the receiver receives specification of multiple specified colors; and for the multiple specified colors that are a color in the gamut range, the evaluator causes the generator to generate the image data to create the color chart referenced to the specified color, and for the multiple specified colors that are a color outside the gamut range, selects a color on the gamut surface, and causes the generator to generate the image data to create the color chart referenced to the selected color.

This aspect of the invention enables specifying multiple colors as specified colors. For each of the multiple specified colors that are a color in the gamut range, image data can be generated to create a color chart referenced to each specified color. For each of the multiple specified colors that is a color outside the gamut range, this configuration selects a color on the gamut surface, and creates a color chart referenced to the selected color.

Another aspect of the invention is a program executed by a computer disposed to an information processing device having a generator configured to generate image data to create a color chart with multiple patches, the program causing the computer to execute steps of: receiving specification of a specified color used as a reference to produce the patches; determining whether or not the received specified color is a color in a gamut range, which is a range of colors a printing device can reproduce; causing the generator to generate the image data to create the color chart referenced to the specified color when the specified color is a color in the gamut range; and causing the generator to select a color on the gamut surface based on the specified color, and generate the image data to create the color chart referenced to the selected color, when the specified color is a color outside the gamut range.

This aspect of the invention generates image data to create a color chart referenced to a specified color when the specified color is a color in the gamut range. When the specified color is a color outside the gamut range, a color on the gamut surface is selected based on the specified color, and image data for creating a color chart referenced to the selected color is generated. Color matching appropriate to the printers is therefore possible irrespective of whether or not the specified color is a color in the gamut range.

Another aspect of the invention is a control method of an information processing device having a generator configured to generate image data to create a color chart with multiple patches, including steps of: receiving specification of a specified color used as a reference to produce the patches; determining whether or not the received specified color is a color in a gamut range, which is a range of colors a printing device can reproduce; causing the generator to generate the image data to create the color chart referenced to the specified color when the specified color is a color in the gamut range; and causing the generator to select a color on a gamut surface based on the specified color, and generate the image data to create the color chart referenced to the selected color, when the specified color is a color outside the gamut range.

This aspect of the invention generates image data to create a color chart referenced to a specified color when the specified color is a color in the gamut range. When the specified color is a color outside the gamut range, a color on the gamut surface is selected based on the specified color, and image data for creating a color chart referenced to the selected color is generated. Color matching appropriate to the printers is therefore possible irrespective of whether or not the specified color is a color in the gamut range.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
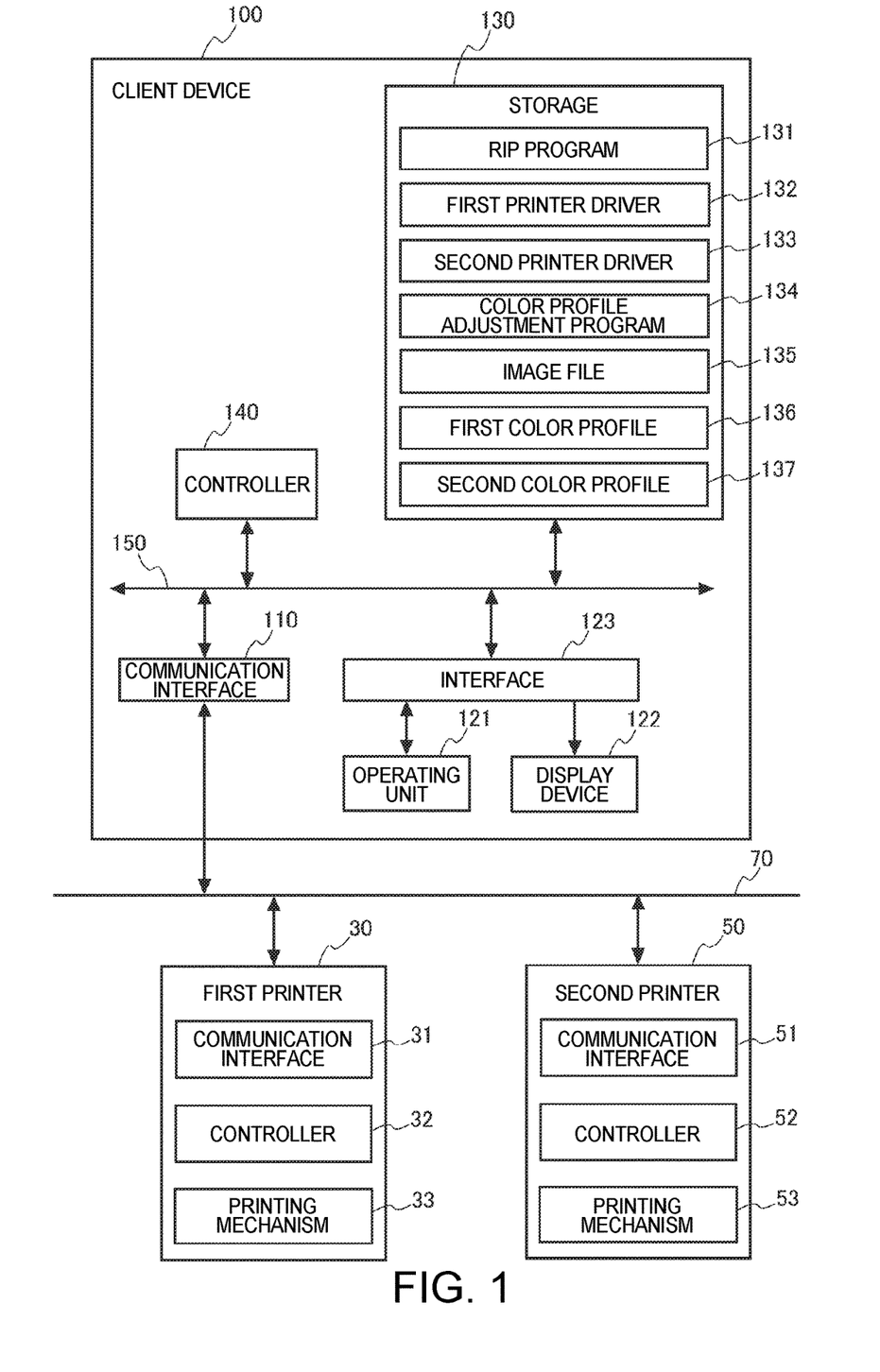
FIG. 1 is a block diagram illustrating the configuration of a printing system.

FIG. 1 illustrates the configuration of a printing system 1.

The printing system 1 includes a first printer 30 and a first printer 30 that print based on print data, and a client device 100 that instructs the first printer 30 and second printer 50 to print.

The client device 100 is an example of an information processing device according to the invention.

The second printer 50 is an example of a printing device.

These devices connect through a communication network 70 such as the Internet (R), or a LAN (local area network) defined by a known standard such as token ring or FDDI (Fiber-Distributed Data Interface). The first printer 30 and second printer 50 may alternatively connect to the client device 100 through a data communication cable such as USB (Universal Serial Bus), IEEE 1394, RS-232C instead of through the communication network 70.

The first printer 30 has a communication interface 31, controller 32, and printing mechanism 33. The communication interface 31 handles data communication with the client device 100 through the communication network 70. The controller 32 controls the printing mechanism 33 to print print data received from the client device 100. The printing mechanism 33 prints the print data as controlled by the controller 32.

The second printer 50 is configured identically to the first printer 30, and further description of the configuration of the second printer 50 is omitted.

In this example the first printer 30 is a printer that has been in use, and the second printer 50 is a new printer added to the printing system 1. The first printer 30 and second printer 50 are different models of printers, and are printers with different gamut. The printer gamut indicates the color range the printer can reproduce. As a result, range of color the first printer 30 and second printer 50 can print in this example are different.

The client device 100 has a communication interface 110, operating unit 121, display device 122, interface 123, storage 130, and controller 140. The communication interface 110, interface 123, storage 130 and controller 140 are communicatively connected through a system bus 150. The operating unit 121 is an example of a receiver in the accompanying claims.

The communication interface 110 handles data communication with the first and second printers 30, 50 through the communication network 70.

The operating unit 121 includes a keyboard and mouse as input devices for receiving user operations and input. The interface 123 outputs an operating signal corresponding to the operation received from the keyboard or mouse of the operating unit 121 to the controller 140.

The display device 122 has a display means (not shown in the figure) such as an LCD panel for displaying images and information. The interface 123 displays images and information on the display means as controlled by the controller 140.

The storage 130 is a magnetic disk device such as a hard disk drive, or a semiconductor drive device such as a SSD (solid state drive). The storage 130 may also comprise an EPROM (Erasable Programmable Read Only Memory), EEPROM (Electrically Erasable Programmable Read-Only Memory), flash memory, or other type of nonvolatile memory device.

The data the storage 130 stores includes a RIP program 131, first printer driver 132, second printer driver 133, color profile adjustment program 134, image file 135, first color profile 136, and second color profile 137. The color profile adjustment program is an example of a program in the accompanying claims.

The RIP (Raster Image Processor) program 131 is a program that causes the controller 140 to execute a process of analyzing the image file 135 and rendering raster image data.

The first printer driver 132 is a device driver controlling the first printer 30, and is a software program executed by the client device 100. The client device 100 runs the first printer driver 132, and generates the print data sent to the first printer 30. The second printer driver 133 is a device driver controlling the second printer 50, and is a software program executed by the client device 100. The client device 100 runs the second printer driver 133, and generates the print data sent to the second printer 50.

The color profile adjustment program 134 is a program for color matching the colors output by the newly introduced second printer 50 to the color output of the first printer 30 already in the system. More specifically, the color profile adjustment program 134 is a program for color matching the color the second printer 50 outputs when the second printer 50 prints the specified color to the color the first printer 30 outputs when printing the specified color.

The operation of the controller 140 when executing the color profile adjustment program 134 is described in detail below.

The image file 135 is a file containing image data with a file extension such as .pdf or .ai. The image file 135 is processed by the controller 140, converted to raster image data, and sent to the first printer 30 or second printer 50.

The first color profile 136 is an ICC (International Color Consortium) profile defining the color attributes of the first printer 30.

An ICC profile is information describing the correlation between a device-dependent color space (device-dependent color) and a color space that is not device-dependent (device-independent color). A color space such as RGB or CMYK is used for the device-dependent color space. A color space such as CIE L*a*b* or CIE XYZ is used for the color space that is not device-dependent. In this example, the first color profile 136 uses the CMYK color space is used as the device-dependent color space, and uses the L*a*b* color space as the color space that is not device-dependent.

The first color profile 136 relates a CMYK value to a color value expressed by coordinates in the L*a*b* color space. More specifically, the first color profile 136 correlates a selected color value in the L*a*b* color space to the color (CMYK value) the first printer 30 outputs when outputting the color corresponding to the color value selected in the L*a*b* color space.

The second color profile 137 is an ICC (International Color Consortium) profile defining the color attributes of the second printer 50. The second color profile 137 also uses the CMYK color space is used as the device-dependent color space, and uses the L*a*b* color space as the color space that is not device-dependent. More specifically, the second color profile 137 correlates a selected color value in the L*a*b* color space to the color (CMYK value) the second printer 50 outputs when outputting the color corresponding to the color value selected in the L*a*b* color space.

The controller 140 is embodied by hardware such as ROM (read-only memory), RAM (random access memory), a CPU (Central Processing Unit), and other peripheral circuits (all not shown), and controls parts of the client device 100. The controller 140 is an example of a computer incorporated in the information processing device in the accompanying claims.

The ROM is a nonvolatile memory device such as flash ROM, and stores a control program and data. The RAM is used as working memory when the CPU executes processes. The CPU writes a control program read from ROM or storage 130 into RAM, and executes the control program from RAM to control the parts of the client device 100.

Figure 2:
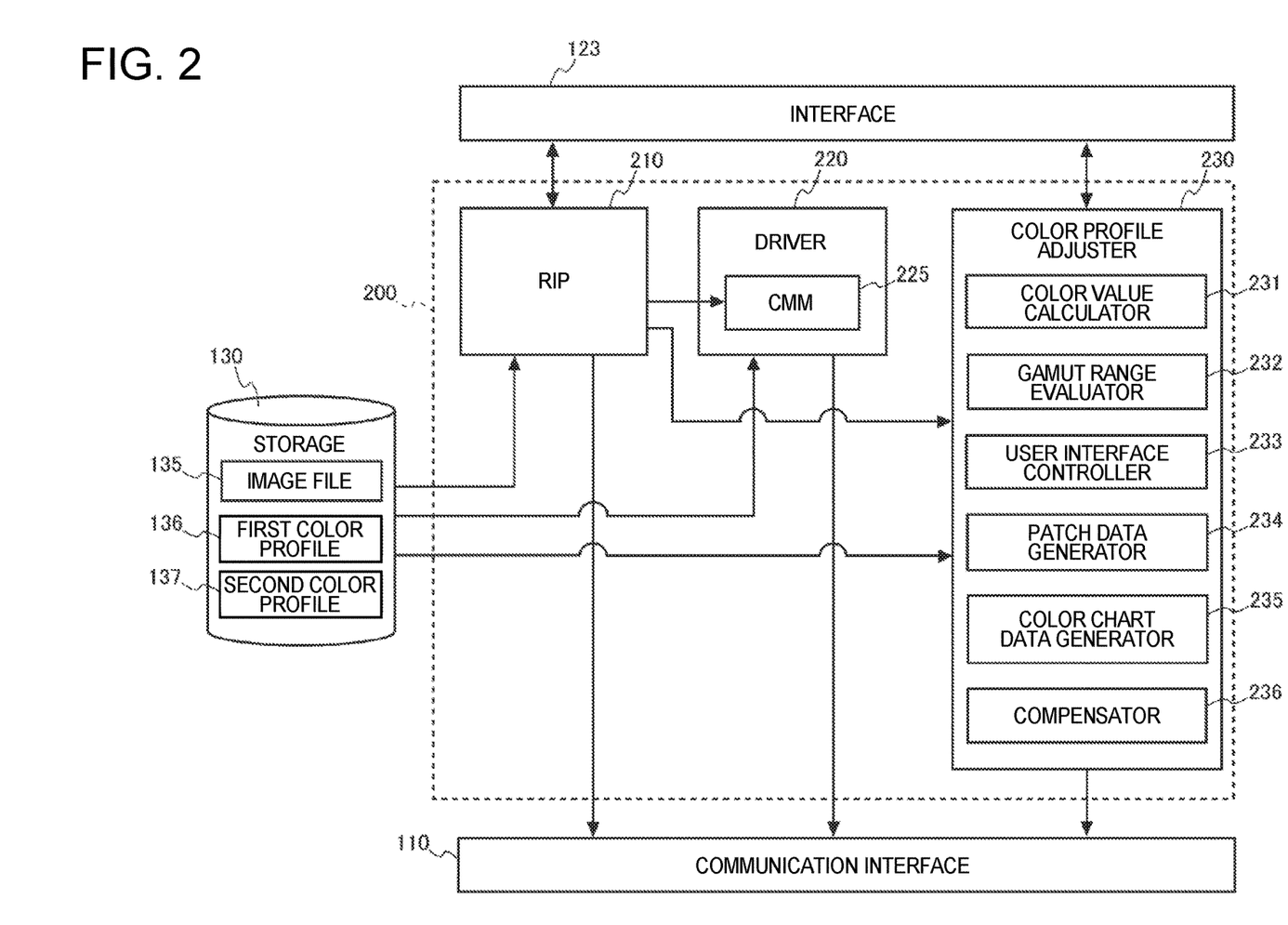
FIG. 2 is a function block diagram of the controller.

FIG. 2 shows the function blocks 200 of the controller 140.

The function blocks 200 represent functions embodied by the CPU executing processes according to control programs such as the RIP program 131 and color profile adjustment program 134. The function blocks 200 do not indicate a specific application or hardware configuration.

Function blocks of the client device 100 include a RIP 210, driver 220, and color profile adjuster 230.

The RIP 210 is a function block 200 embodied by the CPU running the RIP program 131. The driver 220 is a function block 200 embodied by the CPU running the second printer driver 133. The color profile adjuster 230 is a function block 200 embodied by the CPU running the color profile adjustment program 134.

The RIP 210 reads the image file 135 from the storage 130, rasterizes the read image file 135, and generates bitmap data. The generated bitmap data is data expressing the pixel value of each pixel in the bitmap by CMYK values indicating the values of the C (cyan), M (magenta), Y (yellow) and K (black) color components. The RIP 210 then outputs the generated CMYK values to the driver 220 and color profile adjuster 230. The RIP 210 also outputs the CMYK value of the pixels in the bitmap through the interface 123 to the display device 122. The CMYK values of the pixels displayed on the display device 122 may be the CMYK values of predetermined pixels, or the CMYK values of pixels selected by the user.

The driver 220 includes a CMM (Color Management Module) 225.

The driver 220 reads the first color profile 136 and second color profile 137 from the storage 130. The first color profile 136 and second color profile 137 are then input to the CMM 225. The CMYK values are also input from the RIP 210 to the CMM 225.

The CMM 225 converts the CMYK values input from the RIP 210 to color values in the L*a*b* color space using the first color profile 136. The CMM 225 also transforms the converted color values in the L*a*b* color space to CMYK values using the second color profile 137. In other words, the CMM 225 transforms the CMYK values of each pixel in the bitmap file to color values in the L*a*b* color space corresponding to the color attributes of the first printer 30. The CMM 225 then transforms the converted color values of the L*a*b* color space to CMYK values corresponding to the color attributes of the second printer 50.

The CMYK values converted by the CMM 225 are sent through the communication interface 110 to the second printer 50, also enabling printing by the second printer 50.

The color profile adjuster 230 includes a color value calculator 231, gamut range evaluator 232, user interface controller 233, patch data generator 234, color chart data generator 235, and compensator 236.

The color chart data generator 235 is an example of a generator in the accompanying claims, and the gamut range evaluator 232 is an example of an evaluator in the accompanying claims.

The color profile adjuster 230 reads the first color profile 136 and second color profile 137 from the storage 130. The first color profile 136 that is read is input to the color value calculator 231. The second color profile 137 that is read is input to the gamut range evaluator 232.

The CMYK values are input to the color value calculator 231 from the RIP 210. Operating signals corresponding to the operations received by the input devices from the interface 123 are input to the color value calculator 231.

The user, operating an input device, selects a color (CMYK values) for color matching from the colors (CMYK values) displayed on the display device 122. Multiple colors can be selected as colors for color matching.

Based on the operating signal input from the interface 123, the color value calculator 231 selects, from the CMYK values input from the RIP 210, the CMYK values of the color selected by the user (referred to below as the specified color).

Using the first color profile 136, the color value calculator 231 transforms the CMYK values of the specified color to a color value in the L*a*b* color space. The color value calculator 231 then outputs the transformed color value to the gamut range evaluator 232.

The gamut range evaluator 232 converts the color value input from the color value calculator 231 to CMYK values using the second color profile 137. The gamut range evaluator 232 determines whether or not the converted CMYK values identify a color in the gamut range of the second printer 50. In other words, the gamut range evaluator 232 determines whether or not the converted CMYK values are a color the second printer 50 can output. The gamut range evaluator 232 sends the decision to the user interface controller 233.

When multiple colors are selected as specified colors, the gamut range evaluator 232 also determines, for all of the selected specified colors, if the color is within the gamut range of the second printer.

The user interface controller 233 presents a user interface on the display device 122. The user interface controller 233 displays a color chart configuration screen 250 corresponding to the decision input from the gamut range evaluator 232 on the display device 122.

A color chart is a chart with multiple rows of color patches, which are color samples. The user specifies the specified color, and selects, from the color patches formed in the color chart printed by the second printer 50, the color patch that matches or is closest to the color the first printer 30 printed as the specified color in the printout.

The color profile adjuster 230 then adjusts the second color profile 137 based on the selected color patch, and matches the color printed by the second printer 50 to the color printed by the first printer 30.

Figure 3:
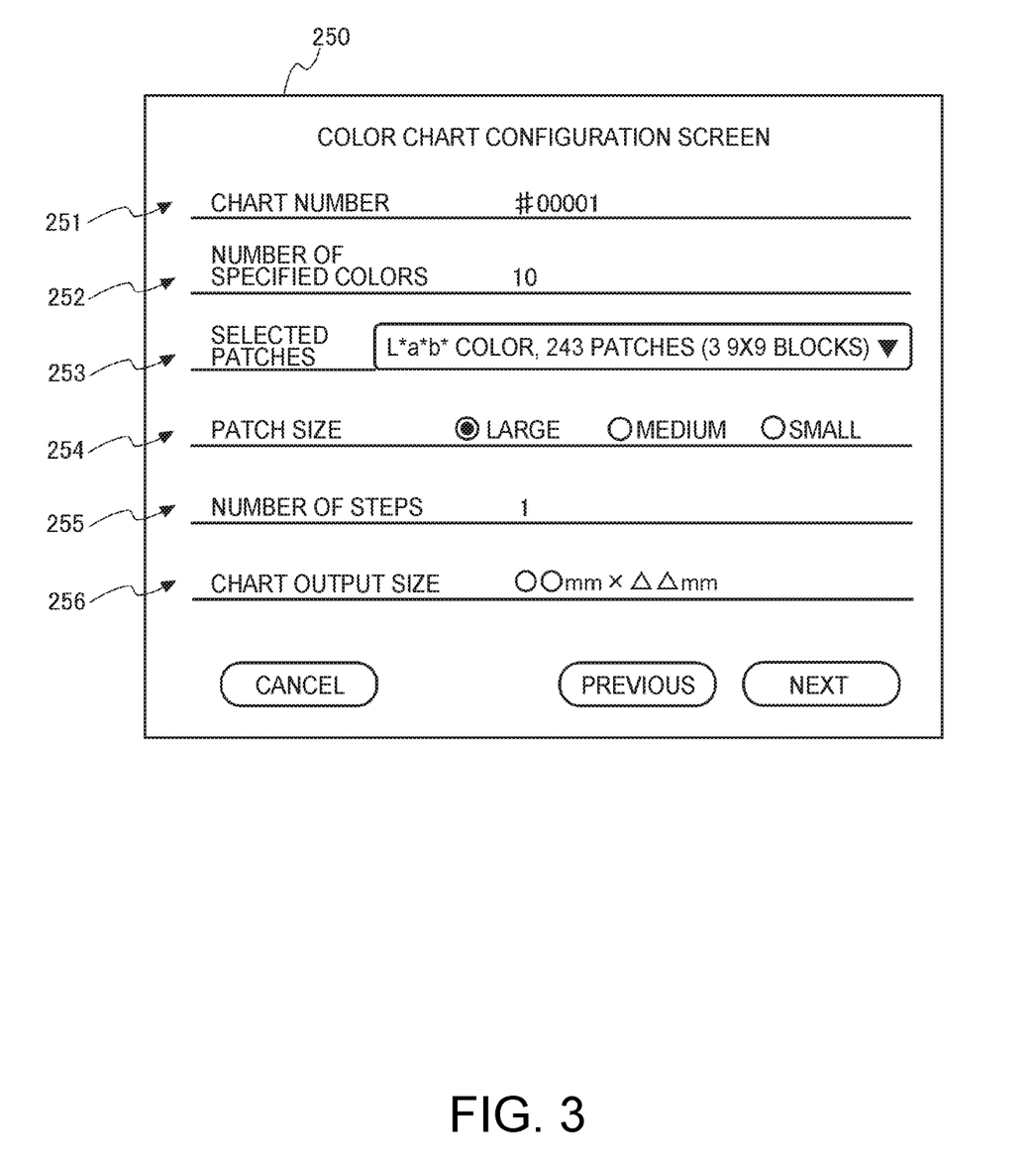
FIG. 3 shows an example of a color chart configuration screen.

FIG. 3 shows an example of a color chart configuration screen 250 displayed on the display device 122 when all of the specified colors are in the gamut range of the second printer 50.

Figure 4:
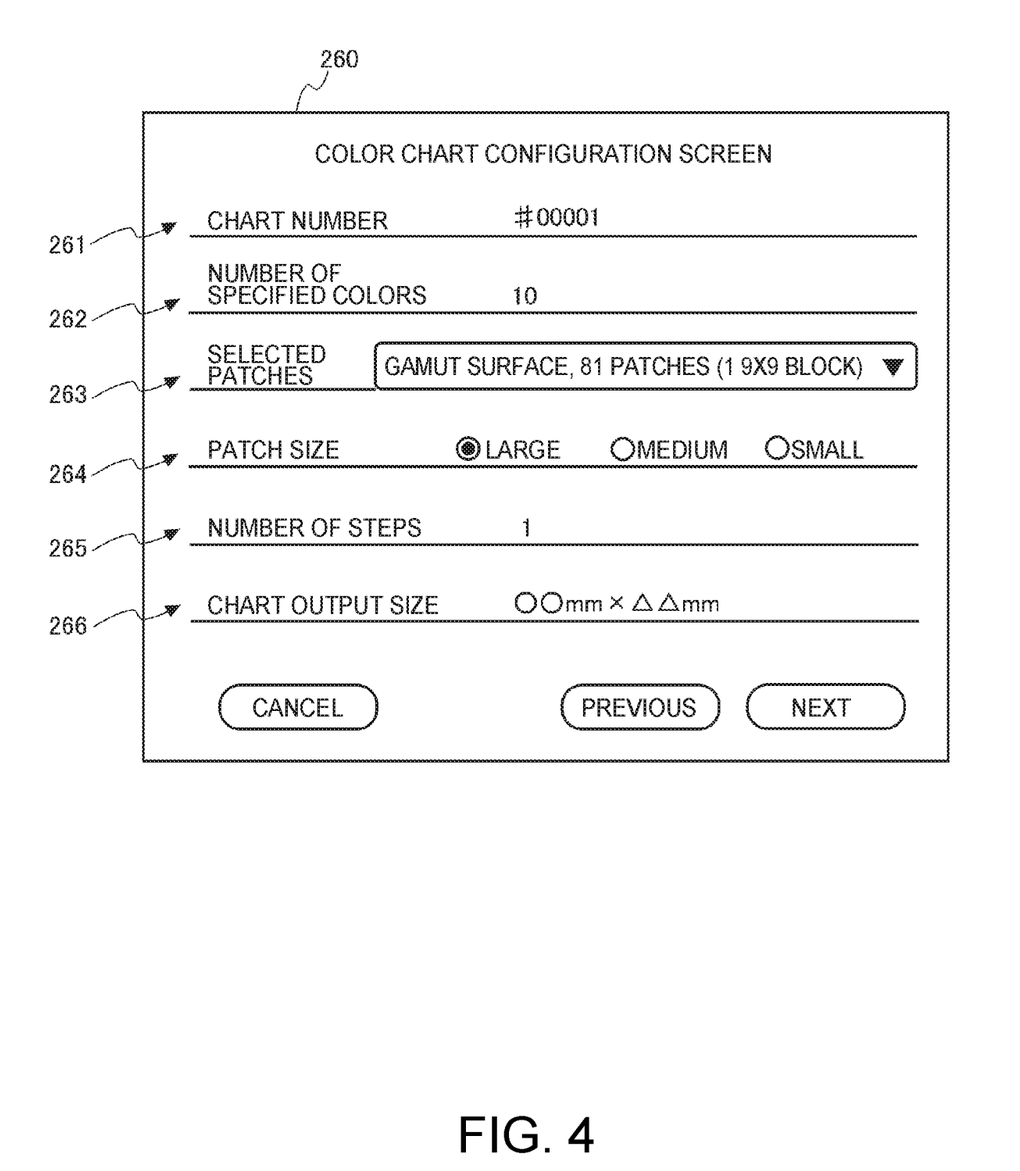
FIG. 4 shows an example of a color chart configuration screen.

FIG. 4 shows an example of a color chart configuration screen 260 displayed on the display device 122 when all of the specified colors are outside the gamut range of the second printer 50.

Figure 5:
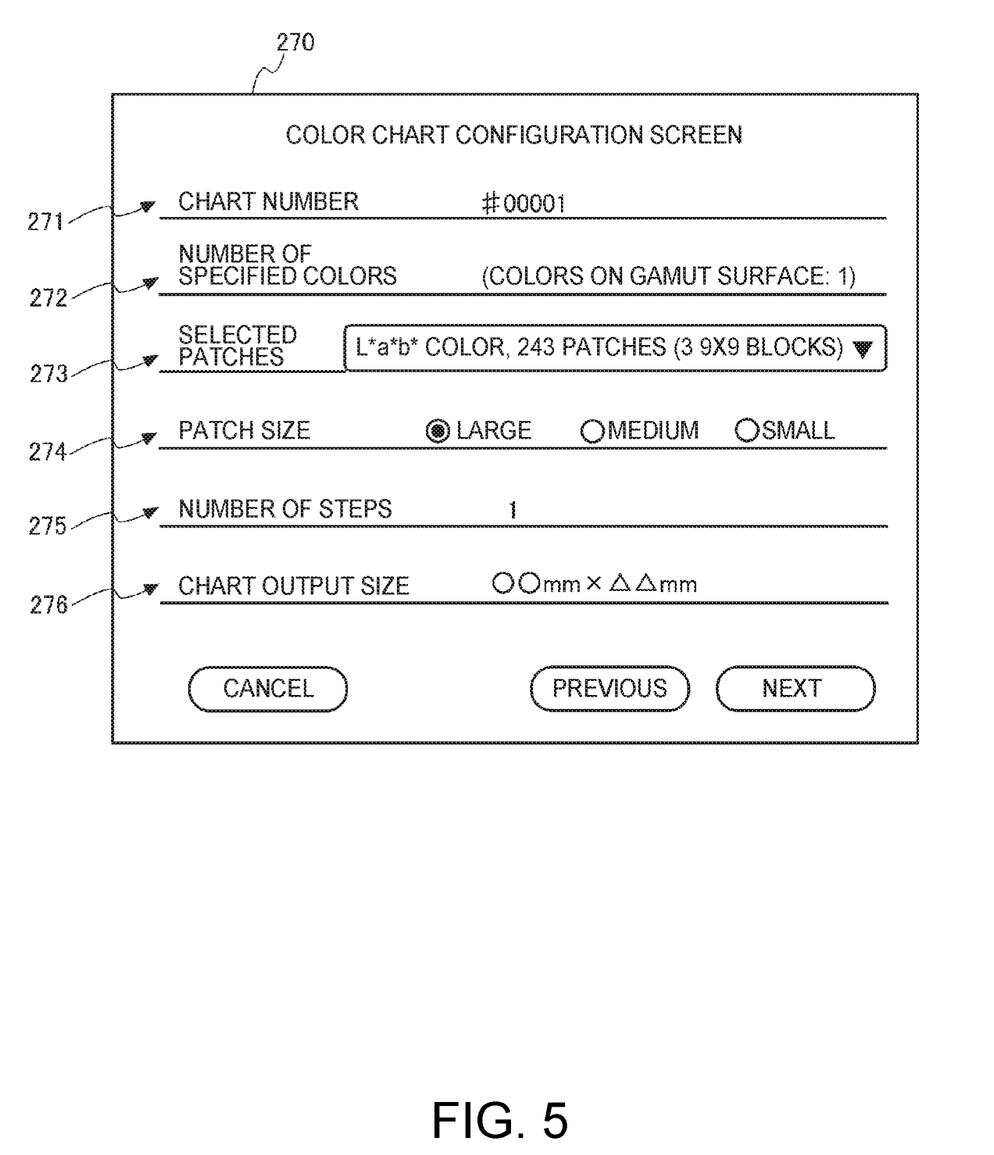
FIG. 5 shows an example of a color chart configuration screen.

FIG. 5 shows an example of a color chart configuration screen 270 displayed on the display device 122 when some of the specified colors are in the gamut range of the second printer 50 and the rest are outside the gamut range of the second printer 50.

Each of the configuration screens 250, 260, 270 includes a chart number 251, 261, 271, the number of specified colors 252, 262, 272, and a patch selection field 253, 263, 273. The configuration screens 250, 260, 270 also include the patch size 254, 264, 274, number of steps 255, 265, 275, and chart output size field 256, 266, 276. The number of steps 255, 265, 275 is an example of a color information difference in the accompanying claims.

The chart number 251, 261, 271 is an identification number assigned to the color chart generated by the color profile adjuster 230.

The number of specified colors 252, 262, 272 indicates the number of colors selected by the user for color matching. When more than one color is selected as a specified color, the color profile adjuster 230 generates a color chart for each of the multiple specified colors that were selected.

When multiple colors are selected as specified colors, some of the specified colors are in the gamut range of the second printer 50, and the remaining specified colors are outside the gamut range of the second printer 50, both the number of specified colors and the number of specified colors outside the gamut range are displayed as shown in color chart configuration screen 270.

The patch selection field 253, 263, 273 is a selection field for selecting the color information (such as color values, CMYK values, RGB values) of the patches created in the color chart, and the number of patches to create in the color chart.

The patch size 254, 264, 274 is a field for setting the size of the patches created in the color chart. In this example, one of three sizes, large, medium, and small, can be selected.

The number of steps 255, 265, 275 indicates the incrementation of the patches in the color chart. The difference in the color information between adjacent patches in the multiple patches arrayed in the color chart corresponds to the number of steps. In other words, changing the number of steps 255, 265, 275 changes the color information of the patches in the color chart.

For example, if a color value is selected in the patch selection field 253, 263, 273 and 1 is selected as the number of steps, the patches in the color chart are created so that at least one of the L*, a*, b* values defining the color value differs by 1 in each adjacent patch.

Figure 6:
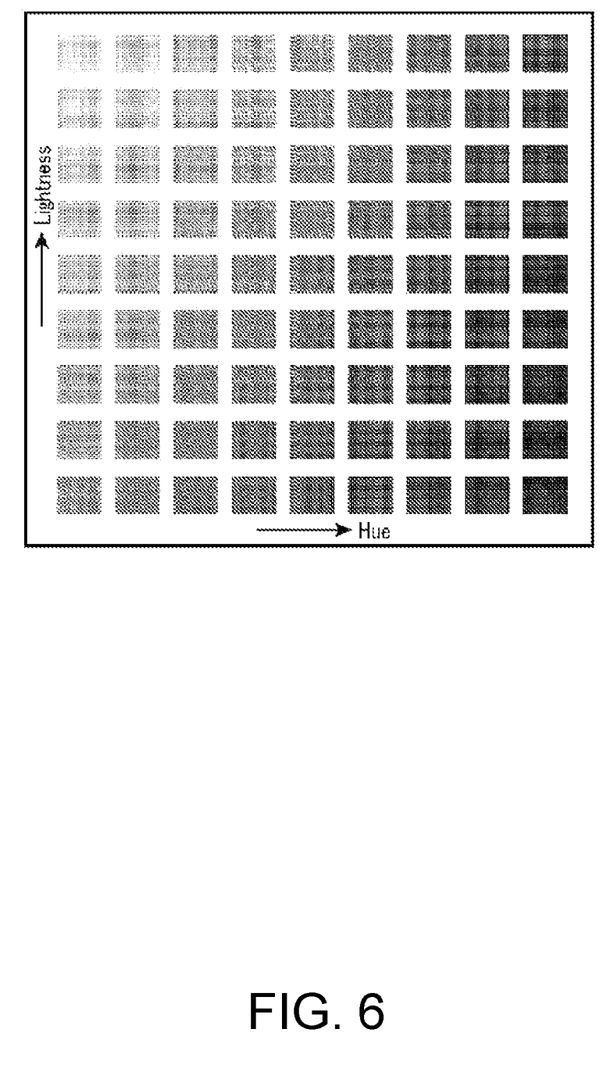
FIG. 6 shows an example of a color chart generated when a color outside the gamut range is specified.

FIG. 6 shows an example of a color chart generated when a color outside the gamut range is selected as the specified color.

FIG. 6 shows a color chart for selecting a color with lightness on the Y-axis and hue on the X-axis. The color chart in FIG. 16 has rectangular color patches arranged in a 9×9 matrix. While not shown in FIG. 6, identification information identifying a particular patch is also printed beside each patch. The user selects one patch printed in the color chart by inputting the identification information printed on the color chart with the input device.

In this embodiment, the number of patches that can be selected when a color outside the gamut range of the second printer 50 is selected as the specified color is set to be less than the number of patches that can be selected when a color inside the gamut range of the second printer 50 is selected as the specified color. In other words, the number of patches that can be selected in the color chart configuration screen 260 shown in FIG. 4 is less than the number of patches that can be selected in the color chart configuration screen 250 shown in FIG. 3.

For example, when a color inside the gamut range of the second printer 50 is selected as the specified color, the number of patches that can be selected is three blocks of a 9×9 matrix. This means that three blocks of patches arranged in a 9×9 block of patches can be selected. In other words, when a color inside the gamut range of the second printer 50 is selected as the specified color, a color chart having three blocks of color patches in a 9×9 matrix as shown in FIG. 6 can be generated.

When a color outside the gamut range of the second printer 50 is selected as the specified color, the number of patches that can be selected is one block of a 9×9 matrix. This means is the number of patches that form one block when the patches are arranged in a 9×9 block of patches as shown in FIG. 6.

The patch data generator 234 generates patch data according to the settings in the configuration screens 250, 260, 270.

When the specified color is a color in the gamut range of the second printer 50, the patch data generator 234 selects, reference to this specified color, other colors in the gamut range to form as patches. The number of other colors selected is the number set in the patch selection field 253 of the color chart configuration screen 250 minus 1. For example, if the setting in the color chart configuration screen 250 is three 9×9 blocks, 242 is set as the number of other colors, and 243 colors including the specified color are selected.

The patch data generator 234 selects, referenced to the specified color, other colors changing the color information of the specified color by the number of steps set by the number of steps 255. For example, if the number of steps is 1, and a color chart is generated with lightness on the Y-axis and hue on the X-axis, the patch data generator 234 selects colors changing at least one of the lightness and hue values by 1 in each adjacent patch. The patch data generator 234 then outputs the color information for the other selected colors and the specified color as patch data to the color chart data generator 235. This color information is the color information selected in the selected patch field 253, such as the color value in the L*a*b* color space.

When the specified color is a color outside the gamut range of the second printer 50, the patch data generator 234 first selects a color on the gamut surface based on the specified color. A color on the gamut surface is a color at the extreme outside edge of colors in the gamut range.

AS a method of selecting a color on the gamut surface, the patch data generator 234 may, for example, select a color on the gamut surface that is similar to (near) the specified color. Alternatively, the patch data generator 234 may select as the color on the gamut surface a color that is on a straight line between the origin of the color space indicated by the color information and is on the gamut surface. For example, if a color value in the L*a*b* color space is selected as the color information, the patch data generator 234 selects a color that is on the gamut surface on a line between the origin of the L*a*b* color space (L*=0, a*=0, b*=0) and the color value of the specified color.

When a color on the gamut surface is selected, the patch data generator 234 selects other colors from the gamut surface referenced to the selected color. The patch data generator 234 selects the other colors by changing the color information of the selected color by the number of steps set in the number of steps 265 field. The selected other colors are also colors on the gamut surface.

The number of other colors selected by the patch data generator 234 is the number set in the patch selection field 263 of the color chart configuration screen 260 minus 1. The patch data generator 234 then outputs the color information for the selected colors and the other selected colors as patch data to the color chart data generator 235.

When multiple colors are selected as specified colors, the patch data generator 234 selects, for each of the multiple specified colors selected, the colors formed in the color chart.

The patch data generator 234 applies, to each of the multiple specified colors that is a specified color in the gamut range, a process of selecting other colors in the gamut range referenced to the specified color.

The patch data generator 234 also applies, to each of the multiple specified colors that is a specified color outside the gamut range, a process of selecting a color on the gamut surface based on the specified color, and referenced to the selected color selecting other colors from the gamut surface.

The color chart data generator 235 generates image data arranging the patch data generated by the patch data generator 234 according to the settings in the appropriate configuration screen 250, 260, or 270. A color chart is then produced by outputting the image data to the second printer 50 and printing.

When the specified color is a color outside the gamut range of the second printer 50, the color chart data generator 235 superimposes on the image data text data reporting that the specified color is a color outside the gamut range. In addition, when the specified color is a color outside the gamut range of the second printer 50, the color chart data generator 235 superimposes on the image data text data prompting the user to select the color that is closest to the specified color printed by the first printer 30.

When the specified color is a color outside the gamut range of the second printer 50, a patch of the color matching the specified color will not be contained in the patches printed in the color chart. As a result, the color chart data generator 235 generates and superimposes on the image data text data prompting the user to select the color that is closest to the specified color.

When the specified color is a color in the gamut range of the second printer 50, the color chart data generator 235 superimposes on the image data text data reporting that the specified color is a color in the gamut range. In addition, when the specified color is a color in the gamut range of the second printer 50, the color chart data generator 235 superimposes on the image data text data prompting the user to select the color matching the specified color printed by the first printer 30.

The identification information of the patch printed on the color chart is then input from the interface 123 to the compensator 236. The user selects a patch printed in the color chart, and input the patch identification information by operating the input device. The interface 123 then outputs an operating signal corresponding to the operation received by the input device to the compensator 236. The compensator 236 then evaluates the patch selected based on the input operating signal. The compensator 236 then corrects the values registered in the second color profile 137 based on the color information of the evaluated patch (for example, color value, CMYK values, RGB values), and the CMYK values of the specified color.

Operation of the client device 100 according to this embodiment is described next with reference to the flow charts in FIG. 7 and FIG. 8.

The color profile adjuster 230 first reads the first color profile 136 and second color profile 137 from the storage 130 (step S1). Next, the color profile adjuster 230 inputs the CMYK values of the specified color (step S2). The user, operating the input device, selects from among the colors (CMYK values) displayed on the display device 122 one or more colors (CMYK values) for color matching. Based on the operating signal input from the interface 123, the color profile adjuster 230 selects the CMYK values of the color selected by the user (referred to below as specified color) from among the CMYK values input from the RIP 210.

Next, the color profile adjuster 230 sends the input CMYK values through the communication interface 110 to the first printer 30 (step S3). The first printer 30 prints the received CMYK values on a sheet.

Next, the color profile adjuster 230, based on the first color profile 136, converts the CMYK values of the specified color to L*a*b* values (step S4).

Next, the color profile adjuster 230 converts all of the L*a*b* values to CMYK values using the second color profile 137. The color profile adjuster 230 then determines if the converted CMYK values of all of the specified colors are colors in the gamut range of the second printer 50 (step S5).

If the color profile adjuster 230 determines all of the specified colors are colors in the gamut range of the second printer 50 (step S5: YES), it displays the color chart configuration screen 250 used when all of the specified colors are in the gamut range on the display device 122 (step S6).

If the result of step S5 is No (step S5: NO), the color profile adjuster 230 determines all of the specified colors are colors outside the gamut range of the second printer 50 (step S7). If the color profile adjuster 230 determines all of the specified colors are colors outside the gamut range of the second printer 50 (step S7: YES), it displays the color chart configuration screen 260 used when all of the specified colors are outside the gamut range on the display device 122 (step S8).

If the result of step S7 is No (step S7: NO), the color profile adjuster 230 determines that the specified colors include colors in the gamut range and colors outside the gamut range of the second printer 50. In this case, the color profile adjuster 230 displays the color chart configuration screen 270 used when some of the specified colors are in the gamut range and some of the colors are outside the gamut range (step S9).

The color profile adjuster 230 displays on the display device 122 one of the configuration screens 250, 260, 270, and receives the settings therefrom. In this example, the chart number, number of specified colors, number of patches in the color chart and color information, the patch size, the number of steps, and the chart output size.

Next, the color profile adjuster 230 selects one of the specified colors (step S10). The color profile adjuster 230 then determines if the specified color that was selected is in the gamut range (step S11).

If the color profile adjuster 230 determines the specified color selected is in the gamut range (step S11: YES), the color profile adjuster 230 selects another color to use as the color of a patch in the gamut range referenced to the specified color that was selected (step S12). For example, the color profile adjuster 230 selects as the other color from in the gamut range a similar color that is around the specified color and approximates the specified color. The color profile adjuster 230 then generates image data for printing a patch of the specified color and a patch of the selected other color (step S13). The color profile adjuster 230 also superimposes on the generated image data text data such as "Select the patch that matches the color" (step S14).

If the color profile adjuster 230 determines the specified color selected is outside the gamut range (step S11: NO), the color profile adjuster 230 first selects a color on the gamut surface referenced to the specified color. Next, the color profile adjuster 230 selects from the gamut surface another color to use as the color of a patch referenced to the color that was selected (step S15). For example, the color profile adjuster 230 selects as the other color a color on the gamut surface that is color around the selected color and approximates the specified color. The color profile adjuster 230 then generates image data for printing patches of the specified color and the selected other color (step S16). The color profile adjuster 230 also superimposes on the generated image data text data such as "Select a patch close in color" (step S17).

Next, the color profile adjuster 230 determines if all specified colors have been selected (step S18). If the color profile adjuster 230 determines all specified colors have not been selected (step S18: NO), it returns to step S10. If the color profile adjuster 230 determines all specified colors have been selected (step S18: YES), it sends the generated image data to the second printer 50 (step S19), and causes the second printer 50 to print the color chart.

Next, the color profile adjuster 230 determines if an operation selecting a patch printed in the color chart was received (step S20). If an operation selecting a patch printed in the color chart was not received (step S20: NO), the color profile adjuster 230 waits to receive the selection operation. If an operation selecting a patch printed in the color chart was received (step S20: YES), the color profile adjuster 230 corrects the second color profile 137 based on the color information of the patch selected by the selection operation (step S21).

The client device 100 according to this embodiment of the invention described above has an operating unit 121, and a color profile adjuster 230 including a color chart data generator 235 and gamut range evaluator 232.

The operating unit 121 receives specification of a specified color to use as a reference color for producing patches.

The color chart data generator 235 generates image data for producing a color chart of many patches.

The gamut range evaluator 232 determines whether or not the specified color is a color in the gamut range, which is the range of colors the second printer 50 can reproduce.

If the specified color is a color in the gamut range, the color profile adjuster 230 causes the color chart data generator 235 to generate image data for producing a color chart referenced to the specified color. If the specified color is a color outside the gamut range, the color profile adjuster 230 selects a color on the gamut surface based on the specified color, and causes the color chart data generator 235 to generate image data for producing a color chart referenced to the selected color.

Color matching of the second printer 50 can therefore be executed desirably regardless of whether or not the specified color is a color in the gamut range.

If the specified color is a color outside the gamut range, the color profile adjuster 230 first selects a color on the gamut surface that approximates the specified color. Next, the color profile adjuster 230 causes the color chart data generator 235 to generate image data for producing a color chart including the selected approximate color as a patch.

When the specified color is a color outside the gamut range, a color approximating the specified color can therefore be selected.

The operating unit 121 receives a number of steps setting, which sets the difference in the color information of adjacent patches.

When the specified color is a color outside the gamut range, the color profile adjuster 230 selects colors with color information that differ by the difference setting (number of steps) referenced to the selected color. The color profile adjuster 230 then causes the color chart data generator 235 to produce image data for generating a color chart having patches arranged so that the difference of the color information of the adjacent patches is the set difference.

This configuration makes finding a color that matches the specified color simple, and improves efficiency.

The operating unit 121 also receives information specifying a patch included in the color chart output by the second printer 50.

The color profile adjuster 230 also has a compensator 236 that corrects the color profile for adjusting the color output of the second printer 50 based on the color information of the patch corresponding to the patch selection information received by the operating unit 121.

The second color profile 137 can therefore be desirably corrected, and the first printer 30 and second printer 50 can be desirably color matched.

When the specified color is a color outside the gamut range, the color profile adjuster 230 causes the color chart data generator 235 to generate image data including data indicating that the specified color is outside the gamut range.

The user can therefore be informed that the specified color is a color outside the gamut range. When the specified color is a color in the gamut range, a patch matching the specified color is selected, but when the specified color is a color outside the gamut range, a patch of a color close to the specified color must be selected. As a result, an appropriate patch can be easily selected by reporting that the specified color is a color outside the gamut range.

When the specified color is a color outside the gamut range, the number of patches contained in the image data generated by the color chart data generator 235 is less than the number of patches included in the image data generated by the color chart data generator 235 the specified color is a color in the gamut range.

As a result, a patch of a color close to the specified color can be easily selected.

The operating unit 121 also accepts selection of multiple specified colors. When all of the multiple specified colors are colors outside the gamut range, the color profile adjuster 230 selects colors on the gamut surface for all of the multiple specified colors. The color profile adjuster 230 then causes the color chart data generator 235 to generate image data for producing a color chart referenced to the selected colors.

Multiple colors can therefore be selected as specified colors, a color charts can be generated. Furthermore, when all of the specified colors are a color outside the gamut range of the second printer, a color on the gamut surface is selected for each of the multiple specified colors, and image data can be generated for producing a color chart referenced to each selected color.

The operating unit 121 also accepts selection of multiple specified colors. The color profile adjuster 230 causes the color chart data generator 235 to generate image data for creating a color chart for each of the multiple specified colors that is a color in the gamut range. For each of the multiple specified colors that is a color outside the gamut range, the color profile adjuster 230 causes the color chart data generator 235 to select a color on the gamut surface, and generate image data for creating a color chart referenced to the selected color.

Multiple colors can therefore be selected as specified colors, a color charts can be generated.

For specified colors that are a color in the gamut range, image data can be generated to create a color chart referenced to each specified color. For specified colors that are a color outside the gamut range, a color on the gamut surface is selected for each specified color, and a color chart referenced to the selected color can be generated.

The embodiment described above is a preferred embodiment of the invention. However, the invention is not limited to this embodiment, and embodiments that differ in many ways without departing from the scope of the accompanying claims are conceivable.

For example, the RIP 210 is embodied in the embodiment described above by a CPU running a RIP program 131, but may be embodied by a configuration using a dedicated hardware RIP.

The foregoing embodiment has a first color profile 136 correlating the CMYK values output by the first printer 30 to color values in the L*a*b* color space, and a second color profile 137 correlating color values in the L*a*b* color space to the CMYK values output by the second printer 50.

A single profile combining these two profiles may be stored in the storage 130. This profile stores information correlating the CMYK values output by the first printer 30 to color values in the L*a*b* color space, and information correlating color values in the L*a*b* color space to the CMYK values output by the second printer 50.

The foregoing embodiment describes an example in which the CPU of the controller 140 executing processes. The CPU may be configured from one or a plurality of CPUs, one or a plurality of integrated circuit devices (such as ASICs (application specific integrated circuit) or FPGA (field-programmable gate array)). The CPU may also be a configuration combining one or a plurality of CPUs with one or a plurality of integrated circuit devices.

The function units of the client device 100 shown in FIG. 1 indicate functional configurations, and the specific implementation thereof is not specifically limited. More specifically, hardware components corresponding individually to each function unit are not necessarily required, and configurations in which a single processor embodies the functions of multiple function units by executing a specific program or programs are obviously conceivable. Furthermore, some functions embodied by software in the embodiments may be embodied by hardware, and some functions embodied by hardware in the embodiments may be embodied by software. The specific detailed configurations of other parts of the client device 100 can also be varied as desired without departing from the scope of the invention.

Figure 7:
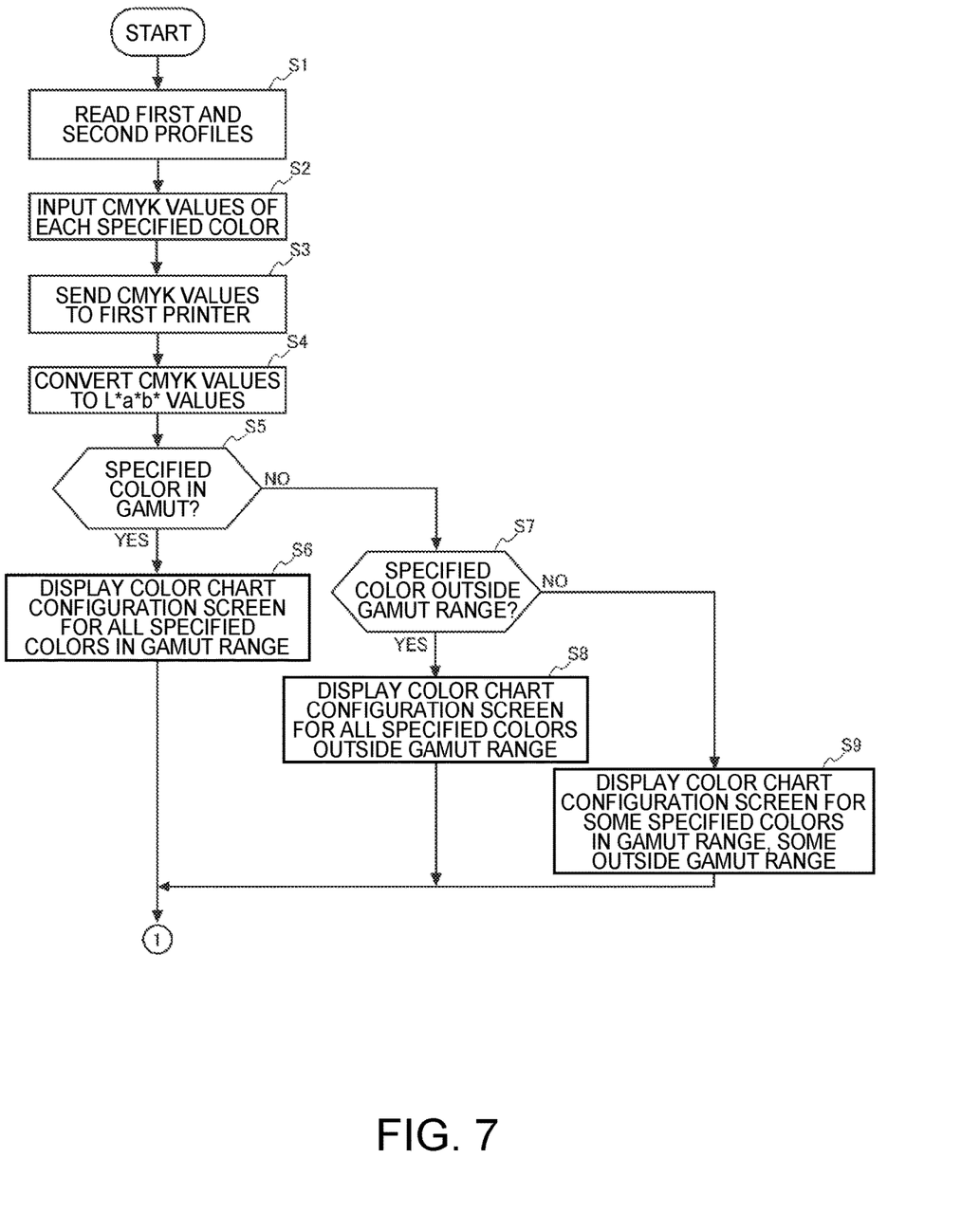
FIG. 7 is a flow chart of the operation of the color profile adjuster.
Figure 8:
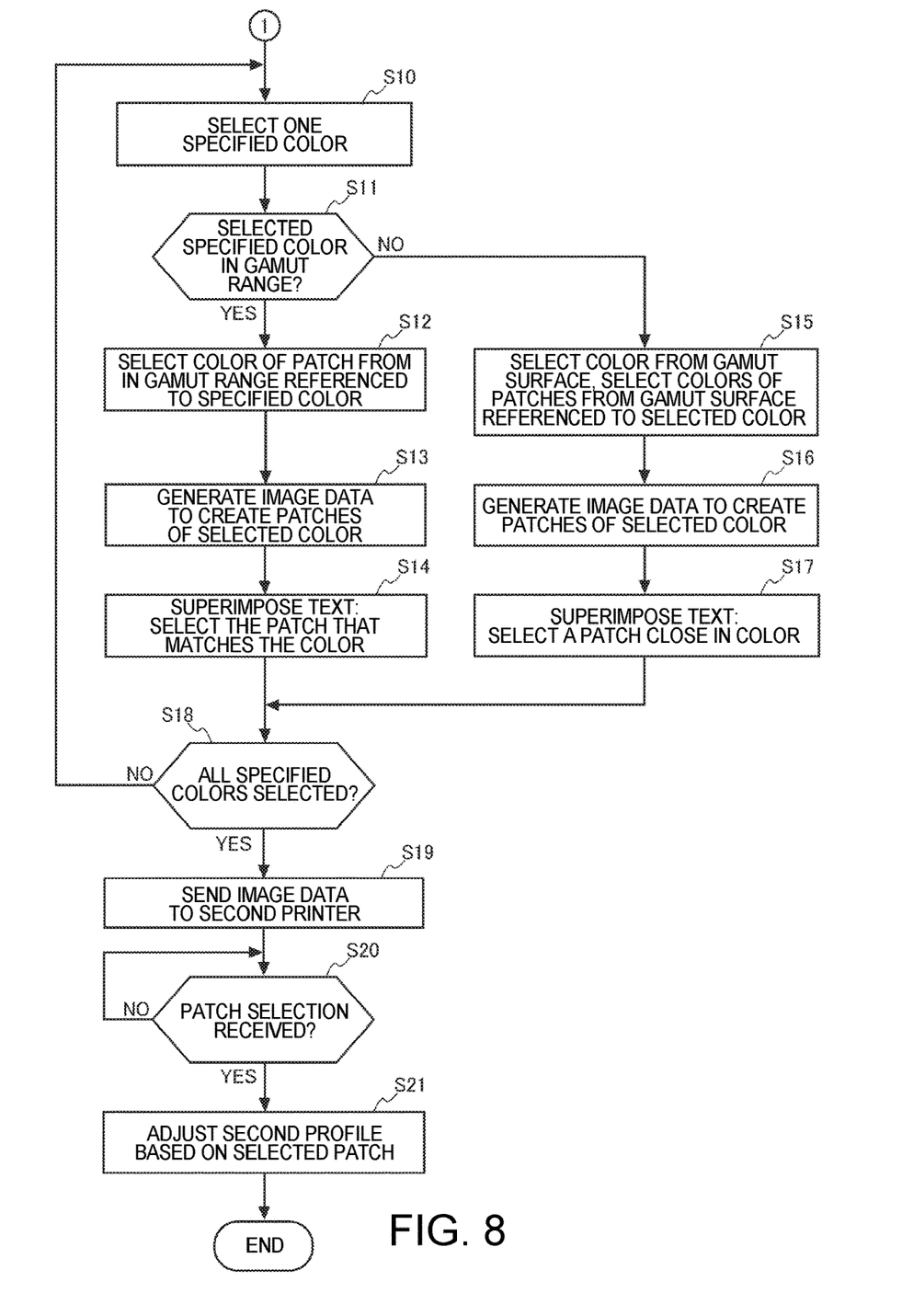
FIG. 8 is a flow chart of the operation of the color profile adjuster.

The process units of the flow charts shown in FIG. 7 and FIG. 8 are divided according to the main content of the processes in order to facilitate understanding the processes of the client device 100. The invention is not limited by the method of segmenting or naming the processing units shown in the flow charts in FIG. 7 and FIG. 8. The processes of color profile adjuster 230 can be further divided into more processing units, or single processing units may be further divided into more processing units, according to the process content. The order of the processes (steps) in the accompanying flow charts is also not limited to that shown in the figures.

In the embodiment described above the program executed by the client device 100 is stored in the storage 130, but the invention is not limited to storing the program in the storage 130. For example, the program may be stored to a computer-readable storage medium such as a floppy disk, DVD, DVD-RAM, or other removable storage medium, or a removable storage medium such as CD-ROM, CD-R, CD-RW, magneto-optical disc, or IC card. The program may also be stored on a server device that connects to the client device 100 through a public telecommunication network, the Internet, LAN, or WAN, and the client device 100 may read and execute the program from the server. The program may also be stored from server device through a public telecommunication network, the Internet, LAN, or WAN to a removable storage medium or other memory device, and the client device 100 may read and run the program therefrom.

The entire disclosure of Japanese Patent Application No.: 2017-146086, filed Jul. 28, 2017 is expressly incorporated by reference herein.

What is claimed is:

1. An information processing device comprising:
a color chart data generator configured to generate image data to create a color chart with multiple patches;
a receiver configured to receive specification of a specified color used as a reference to produce the patches; and
an evaluator configured to determine whether or not the specified color is a color in a gamut range, which is a range of colors a printing device can reproduce;
the evaluator, when the specified color is a color in the gamut range, causes the color data generator to generate the image data to create the color chart referenced to the specified color, and
when the specified color is a color outside the gamut range, selects a color on a gamut surface based on the specified color, and causes the color chart data generator to generate the image data to create the color chart referenced to the selected color,
wherein when the specified color is a color outside the gamut range, the number of patches contained in the image data generated by the color chart data generator is less than the number of patches contained in the image data generated by the color chart data generator when the specified color is a color in the gamut range.

2. The information processing device described in claim 1, wherein:
the evaluator, when the specified color is a color outside the gamut range, selects an approximate color close to the specified color from the gamut surface, and causes the color chart data generator to generate the image data to create the color chart including the selected approximate color as the patches.

3. The information processing device described in claim 1, wherein:
the receiver receives a setting of a difference of color information between adjacent patches in the patches formed in the color chart; and
the evaluator causes the color chart data generator to generate the image data to create the color chart with the patches in the color chart arranged so that the difference of the color information of adjacent patches differs by the set difference.

4. The information processing device described in claim 1, wherein:
the receiver includes a compensator configured to receive information specifying a patch contained in the color chart output to the printing device, and based on the color information of the patch corresponding to the specifying information the receiver received, corrects a profile used to adjust the color output of the printing device.

5. The information processing device described in claim 1, wherein:
when the specified color is a color outside the gamut range, the evaluator causes the color chart data generator to generate the image data including data indicating that the specified color is a color outside the gamut range.

6. The information processing device described in claim 1, wherein:
the receiver receives specification of multiple specified colors; and
when all of the multiple specified colors are a color outside the gamut range, for all of the multiple specified colors, the evaluator selects a color on a gamut surface, and causes the color chart data generator to generate the image data to create the color chart referenced to the selected color.

7. The information processing device described in claim 1, wherein:
the receiver receives specification of multiple specified colors; and
for the multiple specified colors, each of which is a color in the gamut range, the evaluator causes the generator to generate the image data to create the color chart referenced to the specified color, and
for the multiple specified colors, each of which is a color outside the gamut range, selects a color on the gamut surface, and causes the generator to generate the image data to create the color chart referenced to the selected color.

8. A non-transitory computer readable media having stored thereon executable instructions, which, when executed by a processor, causes a computer implemented method to be performed by an information processing device having a color chart data generator configured to generate image data to create a color chart with multiple patches, wherein the computer-implemented method comprises steps of:
receiving specification of a specified color used as a reference to produce the patches;
determining whether or not the received specified color is a color in a gamut range, which is a range of colors a printing device can reproduce;
causing the color chart data generator to generate the image data to create the color chart referenced to the specified color when the specified color is a color in the gamut range; and causing the color chart data generator to select a color on a gamut surface based on the specified color, and generate the image data to create the color chart referenced to the selected color, when the specified color is a color outside the gamut range, wherein when the specified color is a color outside the gamut range, the number of patches contained in the image data generated by the color chart data generator is less than the number of patches contained in the image data generated by the color chart data generator when the specified color is a color in the gamut range.

9. A control method of an information processing device having a color chart data generator configured to generate image data to create a color chart with multiple patches, comprising steps of:

receiving specification of a specified color used as a reference to produce the patches;

determining whether or not the received specified color is a color in a gamut range, which is a range of colors a printing device can reproduce;

causing the color chart data generator to generate the image data to create the color chart referenced to the specified color when the specified color is a color in the gamut range; and causing the color chart data generator to select a color on a gamut surface based on the specified color, and generate the image data to create the color chart referenced to the selected color, when the specified color is a color outside the gamut range, wherein when the specified color is a color outside the gamut range, the number of patches contained in the image data generated by the color chart data generator is less than the number of patches contained in the image data generated by the color chart data generator when the specified color is a color in the gamut range.

* * * * *